Dec. 26, 1933. L. H. STEIN 1,941,025
SHAFT SEALING DEVICE
Filed Sept. 21, 1931

Inventor:
Louis H. Stein,
By Fisher, Clapp, Soans & Pond,
Attys.

Patented Dec. 26, 1933

1,941,025

UNITED STATES PATENT OFFICE 1,941,025

SHAFT SEALING DEVICE

Louis H. Stein, Chicago, Ill., assignor to Aetna Ball Bearing Mfg. Co., Chicago, Ill., a corporation of Illinois Application September 21, 1931
Serial No. 563,937

2 Claims. (Cl. 288—1)

This invention pertains to seals, such as are adapted to be positioned within a stationary housing about a rotatable shaft within the housing, for preventing oil, grease or other liquid from flowing through the housing. An example of the principal intended application of the invention is the rear axle structure of automobiles, wherein the oil seal is tightly fitted within the tubular housing of the rear axle structure and snugly embraces the rotating rear axles to prevent oil or grease from the differential box creeping outwardly along the axle shaft and impairing the action of the rear brakes.

One object of the present invention is to provide a seal of the type and for the purpose specified of extremely simple construction, low cost of manufacture, and high efficiency. Another object is to provide a construction of seal wherein the sealing annulus or ring that embraces the shaft, shall hug the latter in a flexed condition of the annulus or ring whereby, due to its inherent elasticity, wear is automatically taken up and a snug, leak-proof contact is maintained. Another object, attained in the preferred form of the invention hereinafter described, is to provide a seal having a plurality of spaced lines of contact with the shaft, thereby providing a multiple barrier against the passage of oil or other fluid past the seal. And a still further object is to provide an oil seal possessing in a high degree the desirable qualities of durability and longevity.

Still other objects and attendant advantages of the invention will be apparent to persons skilled in the art from the following detailed description, taken in connection with the accompanying drawing, in which I have illustrated two slightly differing practical embodiments of the principle of the invention, and wherein—

Generally described, the device of the invention comprises a holder member, preferably of sheet metal, adapted to tightly fit within a stationary casing and formed with a transverse opening adapted to encircle with considerable clearance a rotary shaft within said casing, and a packing annulus or ring of flexible resilient material, such as commercial manufactured cork, clamped at its outer portion between the sides of said holder member, the internal diameter of the packing ring being less than the diameter of the shaft embraced thereby and the ring being sufficiently narrow or thin to undergo lateral flexing or bending of its inner portion, so that, as the seal is entered on the shaft or the shaft is inserted through the seal, the inner portion of the ring is flexed laterally and bears on the shaft at one corner of its inner periphery. As this corner slowly wears away, the inherent resilience of the ring causes it to maintain a snug bearing on the shaft. Preferably, the inner portions of the side walls of the holder member flare outwardly, and one of them forms a backing or support for the laterally flexed portion of the packing ring, and also constitutes a stop limiting the extent of the flexing movement and cooperating with the elasticity of the ring in maintaining a fluid tight joint between the ring and the shaft. In the preferred and most efficient form of the invention two or more such flexible resilient rings, located side by side, are employed to afford a multiple seal on the surface of the shaft. Also, in the preferred form of the invention the packing ring or rings are impregnated with a substance rendering the ring or rings moisture and grease proof to prevent any absorption by the packing of the oil, grease or other fluid, the passage of which it is designed to prevent.

Figure 1:
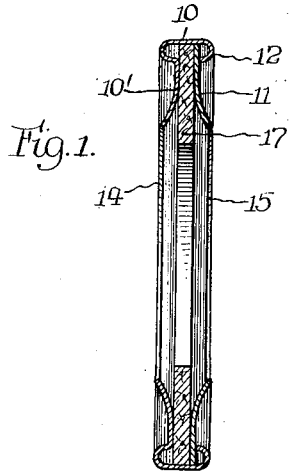
Fig. 1 is a diametric section of the seal employing a single sealing ring.
Figure 2:
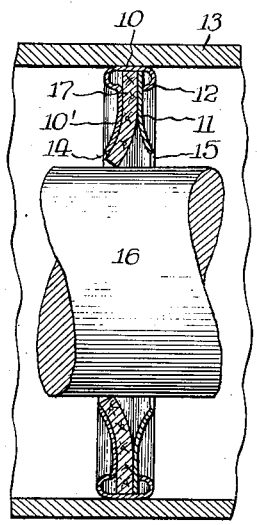
Fig. 2 is a similar view showing the seal applied to a rear axle housing and axle section of an automobile.

Referring to the accompanying drawing, in which I have illustrated the device as embodied in an oil seal for an automobile rear axle structure, and describing first the form of the invention shown in Figs. 1 and 2, the holder member of the seal takes the form of a cage comprising a generally cup-shaped body member, designated as an entirety by 10, and a cover therefor in the form of a disc 11 that is secured in place by spinning or peening the peripheral portion of the body member 10 over the outer edge of the disc, as shown at 12. The outer periphery or rim of the body member 10 is of a diameter to have a tight drive fit within the tubular rear axle housing 13, so as to seal the latter against the passage of oil or grease between the housing and rim, and the bottom wall 10' of the body member 10 and the cover disc 11 are outwardly flared and formed with registering holes 14 and 15 respectively, which, as shown in Fig. 2, encircle the rotating shaft 16 with considerable clearance.

17 designates the packing member, which consists of an annulus or ring preferably of ordinary commercial manufactured cork, which, as is well known, consists of ground natural cork mixed with a gluten or glue binder. This ring 17 is clamped at its outer portion between the bottom wall 10' of the body member 10 and the cover disc 11, and it is sufficiently narrow or thin to enable its inner portion to be bodily flexed or bent laterally, as shown in Fig. 2. And the internal diameter of the ring is so much smaller than the diameter of the shaft 16 that when the ring is pushed over the shaft, or the shaft is pushed through the ring, the inner portion of the ring is thus flexed or bent laterally substantially into contact with one of the walls 10' or 11, and the ring bears on the shaft at one corner of the inner periphery, as shown in Fig. 2. As the corner slowly wears down, the inherent flexibility of the ring causes it to constantly maintain a snug contact with the shaft, thus forming an oil-tight joint. It will thus be seen that in the present invention the reaction of the packing ring to lateral flexing or bending is relied on to secure an oil-tight joint, rather than the reaction of the ring to radial compression, which latter forms the underlying principle of an oil seal forming the subject matter of an earlier application filed by me on the 17th day of August, 1931, Serial No. 557,511.

Figure 3:
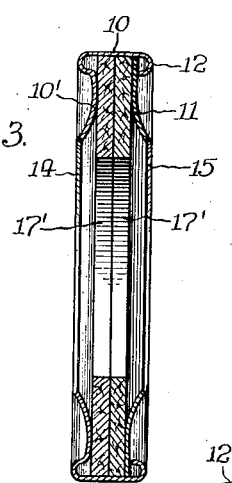
Figs. 3 and 4 are views similar to Figs. 1 and 2, respectively, illustrating a preferred form of the invention employing a plurality of sealing rings.
Figure 4:
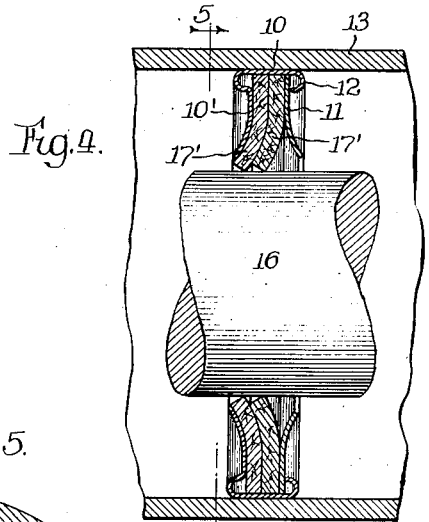
Figure 5:
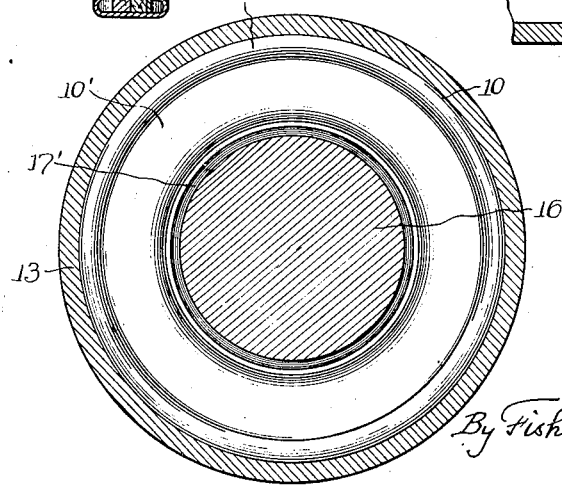
Fig. 5 is a transverse section taken on the line 5—5 of Fig. 4.

A multiple seal form of the invention is illustrated in Figs. 3 and 4, wherein it will be seen that, instead of using a single packing ring 17, as in the structure shown in Figs. 1 and 2, I employ a plurality of identical rings, as 17', disposed side by side in the holder member. This, as shown in Fig. 4, gives a multiple line contact of the packing on the shaft, and thus affords a more reliable and efficient seal. For this reason, the structure shown in Figs. 3 and 4 is preferred, and, of course, three or more rings may be employed, if desired, within the purview of the invention.

The material of the packing ring or rings is preferably cork, since this material is both flexible and resilient, and is practically non-absorbent of oil or water. However, the invention is not limited, in its broader aspects, to a packing of any specific material so long as it possesses the qualities of flexibility and resiliency. Such materials as leather, compressed wood fiber, etc., afford satisfactory results, though not as efficient or durable as cork. The packing, especially when consisting of material other than cork, is preferably impregnated with a shellac or other varnish, linseed oil, or other like material to render it non-absorbent. The packing is also preferably surface-treated with a mixture of oil and graphite to reduce friction. As the device is laterally symmetrical, it permits withdrawal and replacement of the shaft from either end of the casing without disturbing the position of the device in the casing.

The assembled device, in the simple form shown, is a unitary article, capable of easy application and removal, comprises but few parts, does not require the use of springs or clamp bolts to maintain a liquid-proof fit on the shaft, and manifestly can be manufactured and sold at a very low cost. Furthermore, having a substantially line contact or contacts on the shaft, it reduces friction, heat, and power consumption as compared with seals for the same purpose presenting comparatively wide surfaces of contact with the shaft.

Manifestly, minor changes in the details of structure may be made without departing from the substance of the invention as defined in the following claims.

I claim as my invention:—

1. A seal of the type described, comprising a cork ring of sufficient thinness to permit its inner peripheral portion to be flexed laterally when engaged with a shaft, and a holder formed with side walls between which the outer peripheral portion of said ring is clamped, said side walls having their inner peripheral portions flared outwardly to constitute backings for the flexed portion of said ring, and said ring, when entered on the shaft, having a substantially line bearing on the latter at one corner of its inner periphery.

2. A seal of the type described, comprising a plurality of cork rings each of sufficient thinness to permit its inner peripheral portion to be flexed laterally when engaged with a shaft, and a holder formed with side walls between which the outer peripheral portions of said rings are clamped, said side walls having their inner peripheral portions flared outwardly to constitute backings for the flexed portions of said rings, and said rings, when entered on the shaft, having spaced substantially line bearings on the latter at corresponding corners of their inner peripheries.

LOUIS H. STEIN.